United States Patent [19]

Flider

[11] 3,851,791

[45] Dec. 3, 1974

[54] PLASTIC SAFETY CAN FOR CONTAINING FIRES BURNING INFLAMMABLE FLUID INSIDE THE CAN

[75] Inventor: Frank S. Flider, Chicago, Ill.

[73] Assignee: Justrite Manufacturing Company, Chicago, Ill.

[22] Filed: Oct. 10, 1972

[21] Appl. No.: 296,247

Related U.S. Application Data

[63] Continuation-in-part of Ser. No. 98,557, Dec. 16, 1970, abandoned, Continuation-in-part of Ser. No. 97,713, Dec. 14, 1970, Pat. No. 3,727,807, Continuation-in-part of Ser. No. 98,412, Dec. 15, 1970, abandoned, Continuation-in-part of Ser. No. 147,346, May 27, 1971, Pat. No. 3,754,691, Continuation-in-part of Ser. No. 151,354, June 9, 1971, Pat. No. 3,770,160, Continuation-in-part of Ser. No. 147,345, May 27, 1971, Pat. No. 3,729,122, Continuation-in-part of Ser. No. 147,522, May 27, 1971, Pat. No. 3,811,605, Continuation-in-part of Ser. No. 171,537, Aug. 13, 1971, Pat. No. 3,794,235, Continuation-in-part of Ser. No. 171,092, Aug. 12, 1971, Pat. No. 3,746,200.

[52] U.S. Cl................ 220/89 B, 215/1 C, 220/36, 220/70, 220/83, 222/469
[51] Int. Cl................... B65d 25/00, B65d 7/42
[58] Field of Search............ 220/89 B, 36, 83, 70; 215/1 C, 1 R, 1; 222/469

[56] References Cited
UNITED STATES PATENTS

| | | | |
|---|---|---|---|
| 599,286 | /1898 | McAusland | 220/83 |
| 1,954,983 | 4/1934 | Brown | 222/469 |
| 2,335,195 | 11/1943 | Packer | 222/469 |
| 2,538,684 | 1/1951 | Gushard et al. | 215/1 C |
| 2,574,876 | 11/1951 | Lebus | 222/469 |
| 2,748,997 | 6/1956 | Richmond, Sr. | 220/36 |
| 3,100,576 | 8/1963 | Frank | 215/1 C |
| 3,108,710 | 10/1963 | Lange et al. | 150/5 |
| 3,308,997 | 3/1967 | Kelly | 220/94 A |
| 3,405,439 | 10/1968 | Uemura | 220/72 |
| 3,469,747 | 9/1969 | Richmond, Jr. | 222/469 |
| 3,481,501 | 12/1969 | Anderson | 220/94 A |
| 3,537,498 | 11/1970 | Amand | 220/72 |

*Primary Examiner*—William T. Dixson, Jr.
*Assistant Examiner*—Allan N. Shoap
*Attorney, Agent, or Firm*—Alter Weiss Whitesel & Laff

[57] ABSTRACT

This invention provides a plastic safety can for inflammables. The can is preferably blow molded with hardware mounted on the top of the can. The hardware is relatively heavy with a large contact area with the plastic can wall to provide a large heat sink for speeding up the melting and contributing to the collapse of the container top. If fire occurs, the weight of the hardware causes the dome to tear, collapse, and fall away into the bottom of the can. As any inflammable fluid inside the can burns, the can melts and is consumed, but at a rate which always contains the burning fluid. Thus, there is no spilling fluid.

5 Claims, 19 Drawing Figures

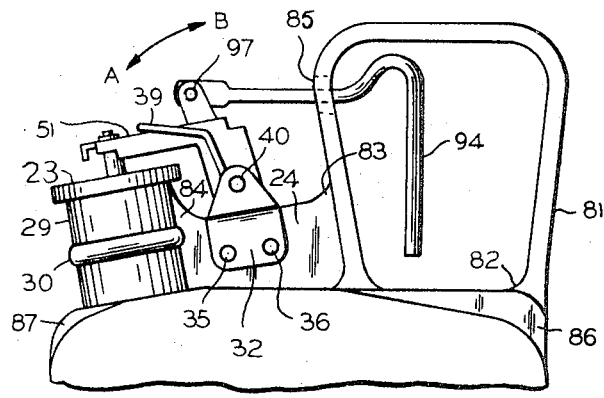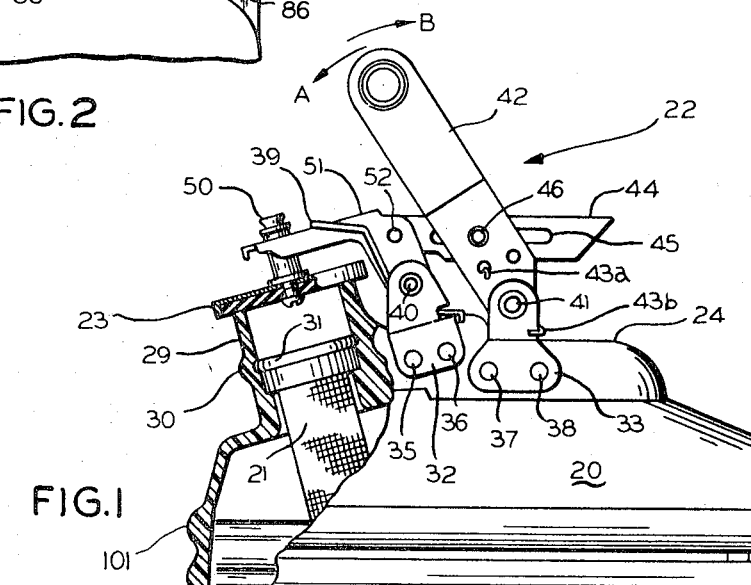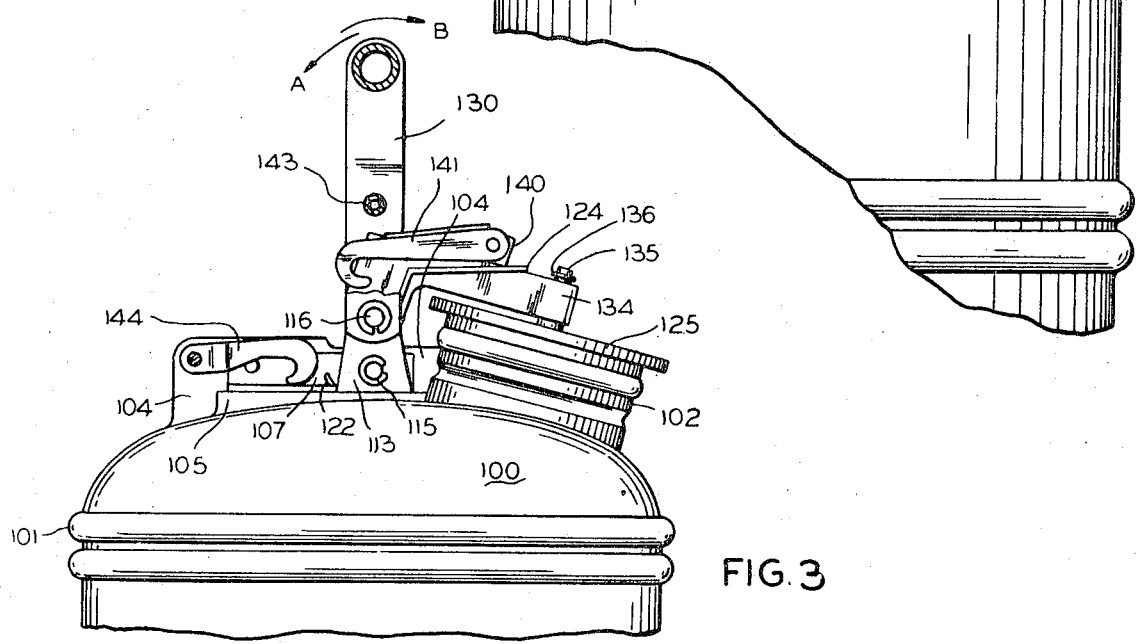

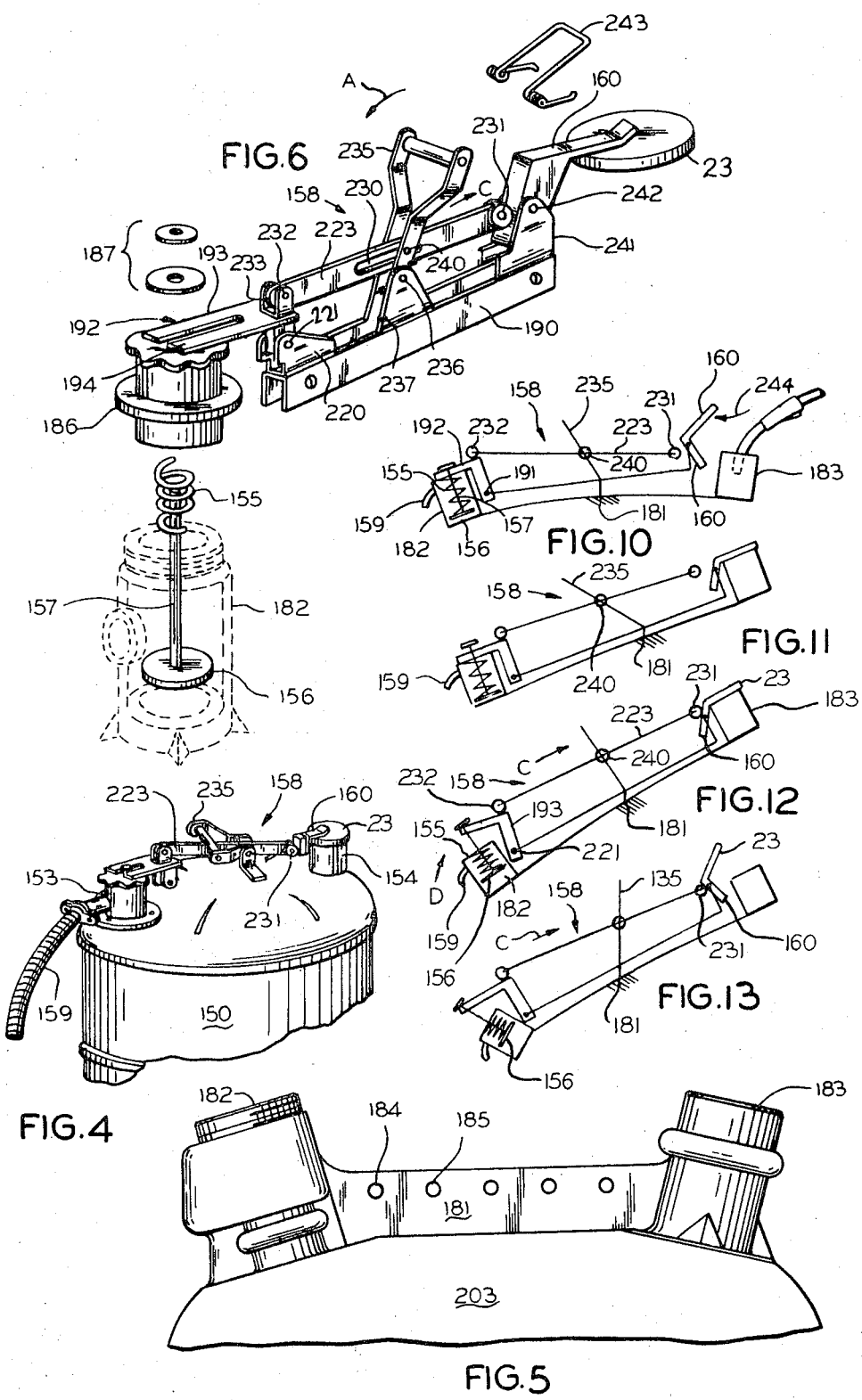

PLASTIC SAFETY CAN FOR CONTAINING FIRES BURNING INFLAMMABLE FLUID INSIDE THE CAN

This is a continuation-in-part of my following co-pending applications which are assigned to the assignee of this invention:

| Title | Serial No. | Filed |
| --- | --- | --- |
| SAFETY CONTAINER FOR INFLAMMABLES WITH CLIP-ON SPOUT | 98,557, now abandoned | 12-16-70 |
| SAFETY CONTAINER FOR INFLAMMABLES | 97,713, now U.S. Pat. No. 3,727,807 on 04/17/73 | 12-14-70 |
| SAFETY CAN POURING SPOUT | 98,412, now abandoned | 12-15-70 |
| SOLVENT DISPENSER | 147,346, now U.S. Pat. No. 3,754,691 on 08/28/73 | 05-27-71 |
| SAFETY DISPOSAL CAN FOR INFLAMMABLE MATERIALS | 151,354, now U.S. Pat. No. 3,770,160 on 11/06/73 | 06-09-71 |
| SAFETY CONTAINER FOR INBLAMMABLES | 147,345, now U.S. Pat. No. 3,729,122 on 04/24/73 | 05-27-71 |
| SAFETY CONTAINER FOR INFLAMMABLE FLUIDS | 147,522, now U.S. 3,811,605 on 05/21/74 | 05-27-71 |
| PLASTIC SAFETY CONTAINER FOR INFLAMMABLES | 171,537, now U.S. Pat. No. 3,794,235 on 02/26/74 | 08-13-71 |
| PLASTIC JERRY CAN | 171,092, now U.S. Pat. No. 3,746,200 on 07/17/73 | 08-12-71 |

This invention relates to plastic safety cans or containers, especially — although not exclusively — to containers for inflammable fluids and, more particularly, to low cost containers having characteristics such that the container burns or melts at a rate which does not allow any inflammable fluid to spill therefrom.

Containers for inflammables usually have prescribed safety specifications enforced by governmental, industrial or trade agencies. Thus, an improved container must meet or exceed these specifications. Also, they must have a sales appeal which goes beyond the sales appeal of previously available safety cans.

By way of example, the inflammables include, but are not limited to:

| | |
| --- | --- |
| Amyl | Formaldehyde |
| Butyl | Gasoline |
| Ethyl | Ether |
| Methyl | Acetone |
| Methanol | Nitric Acid (10% Dilute) |
| Isopropyl | Stoddard Solvent |
| Butanol | Water and Alcohol Mixture. |

The previous containers have generally been made of a heavy gauge steel material which had drawbacks in that they were expensive, hazardous and short lived. They tend to corrode, create hazardous sparks, and scratch the surfaces they contact. Moreover, when metal cans are bumped, they sometimes leak air, leak or spill fluid to sustain fires, create high internal pressures, and explode.

When efforts were made to replace steel containers with plastic safety containers, there was a problem of containing inflammable fluids if fire occurs in or near the containers. If a fire begins, the containers should have characteristics which enable the fire to burn itself out, without either spilling the burning fluid or creating hazardous internal pressures that convert the container into an exploding bomb.

Accordingly, an object of the invention is to provide new and improved plastic safety containers for containing burning inflammable liquids.

A related object of the invention is to provide plastic containers for burning in a manner which always contains the burning fluid without spilling it or allowing excessive pressures to build up. Here an object is to provide a safety container with a top that collapses inside the container and does not fall outside of it.

Yet another object of the invention is to provide means for solidly mounting any of various hardware linkages onto the plastic container in such a manner that the hardware contributes to the collapse of the top and therefore provides a pressure release mechanism. Hence, an object is to provide a low cost burnable, explosion proof, automatically venting gasoline container.

These and other objects are accomplished by an all plastic safety container, which has sides of uniform thickness, free and clear of reinforcing ribs, thick or thin spots that cause internal material stresses likely to lead to ruptured container walls. The container has a plastic wall with a continuously closed inner surface terminating in a dome-shaped top having an opening therein. An upstanding thickened fin on the top surface of the container facilitates an attachment means for securing any of many different forms of optional hardware to the outside of the container without breaking through the inner surface thereof. The hardware is both heavy and of large area to form a massive heat sink to accelerate localized melting, and cause the dome to collapse under the hardware weight if a fire should occur. The side walls of the container are either vertical or tapered inwardly toward the top so that, as the dome melts, it drops into the container and does not drip or fold outside the perimeter of the walls.

The nature of several embodiments of plastic containers has been shown in the above-identified parent applications and are herein summarized. These embodiments exemplify means for accomplishing these and other objects. They may be understood best from a study of the following description and the attached drawings in which, FIG. 1 is an elevational side view (partly in cross section) of an all plastic container having one opening;

FIG. 2 is a side elevational view of a second embodiment with the hardware linkage and a cap shown attached to a fin on the container;

FIG. 3 is a side elevational view of a third embodiment, a plastic disposal container, with hardware in the form of a handle here shown disengaged from cap control linkage;

FIGS. 4 and 5 show a fourth embodiment in the form of a steel and plastic container, respectively, with a double action handle linkage arrangement;

FIG. 6 is an exploded view of the handle controlled linkage for the fourth embodiment;

FIGS. 10–13 are schematic stop motion views showing the operation of the linkage in the fourth embodiment;

FIGS. 1–13 are taken from a few of the parent applications and are presented herein to exemplify the types of containers which may incorporate the invention. The relationship between the invention and the plastic containers shown in the other parent applications, and the plastic container art in general, should be apparent from the following description of these exemplary embodiments.

Figure 8:
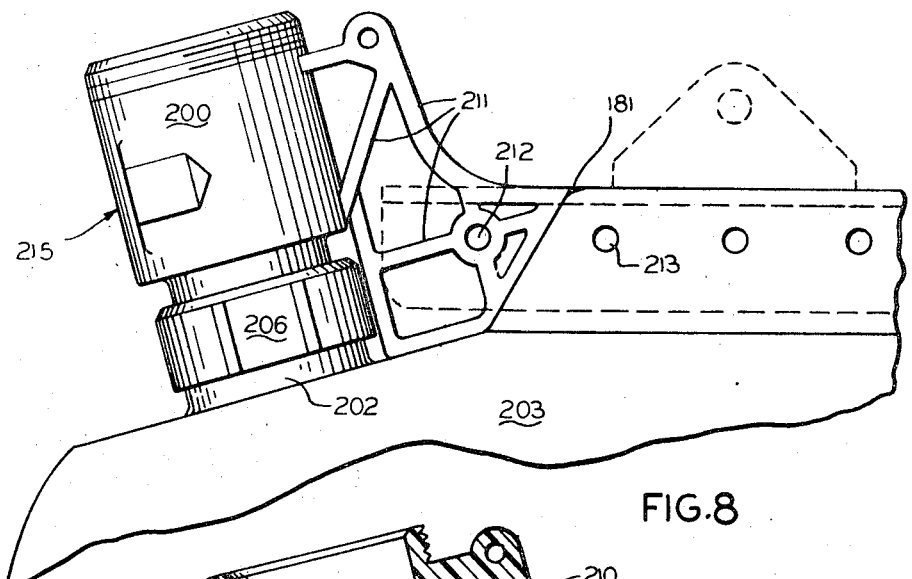
FIGS. 8 and 9 are partial side views of the plastic container, having injection molded parts replacing some of the hardware in FIGS. 6 and 7.

The principal elements in FIG. 1 are an all plastic container 20, a filter screen arrangement 21, and a handle and linkage cap control arrangement 22. The handle and linkage 22 automatically open a normally closed cap 23 when the container is tipped while the handle is held. The cap recloses when the container is set down and the handle is released.

The plastic container 20 is made by any suitable means, such as blow molding inside a mold cavity formed by two piece parts with a parting line which is thickened to form an upstanding fin or rib 24. Preferably, the fin 24 is integral with, and strengthens and supports a neck 29. The strength of the resulting structure is adequate to support the weight of a full container without distortion of the plastic. For example, the handle should sustain a pull in the order of 175 pounds, with no damage. A series of holes are molded into the plastic fin 24 in order to provide a means for attaching the handle and linkage 22 to the container without piercing the walls thereof.

The plastic at 29 is shaped somewhat as the neck of a bottle which enables fluid or other material to be poured into or out of the container 20. The neck opening 29 is normally closed by a spring-biased safety cap 23. The cap 23 includes a gasket of suitable material, such as CN-705, (Accopac) sold by the Armstrong Company. Suspended inside the neck 29 is filter screen 21 which strains the fluid entering and leaving the container and provides a fire barrier. Preferably, two cylindrical screens are provided, one over the other, to prevent a propagation of a flame into the container. To facilitate suspension, the neck has an annular ring 30 for capturing a circular lock ring 31 having the filter screen 21 attached thereto. The screens are preferably made of Type 304 stainless steel, the outer one having a No. 28 mesh and the inner one having a No. 12 mesh.

The safety cap 23 is controlled by the handle and linkage 22, mounted on a fin 24 by saddle brackets 32 and 33. These brackets are attached to the fin 24 by means of rivets 35–38 passing through the holes in the fin 24. Spring 39 urges cap 23 to a closed position with a predetermined pressure. Thus, internal vapor pressure may overcome the bias of spring 39 to vent the container. As the internal vapor pressure falls, the spring 39 recloses the cap 23. Preferably, this pressure relief occurs at about three pounds per square inch of internal pressure, a cap securing spring force which tends to prevent leakage or spilling of the fluid if the container tips over.

The handle and linkage 22 are mounted on the bracket 33 and the top of the container 20, at the center of gravity. Pivotally mounted on bracket 33, at the point 41, is the handle 42 having springs 43a, 43b normally urging the handle 42 to swing in the direction "A" toward a folded or low profile position. Lost motion horizontal linkage bar 44 has a longitudinal slot 45. The pin 46 moves through the length of the slot to enable the user to secure a comfortable grip before lifting the weight of the container. Attached to the cap 23 and forming a part thereof is a pin bracket 50 loosely connected to an L-shaped assembly 51 which is pivotally connected to the saddle bracket 32 by the pin 40. The loose connection allows the cap to center itself when closed. The pin 52 connects the angle point of assembly 51 to the bar 44. When the handle 42 moves in direction "B," the pin 46 encounters the end of the slot 45 to pull the bracket 51 with a sufficient force to open the cap 23, against the bias of the spring 39.

It should now be apparent that, when the container 20 is lifted to a pouring position, the pin 46 pulls the bracket 51 which rocks about pivot point 40 and opens the cap 23. When the handle 42 is released, the reverse action takes place, and the spring 39 closes the cap 23.

FIG. 2 shows a second embodiment of a blow molded container with neck, rib, and handle arrangements utilized on a generally flat top container of oval or round cross section. This second embodiment, plastic container (FIG. 2), has an integral fin 24 molded between the neck 29 and in integrally molded handle 81. The annular ring 30 is shaped to receive filter screen 21, as shown in FIG. 1. The fin 24 has apertures which receive fasteners 35 and 36 for attaching a saddle bracket 32. At the junctions 82, 83, 84, the handle and the fin are preferably filleted for added strength. The handle 81 is wide and strong enough to contain a slot 85 and still carry the weight of a full container, and to provide part of a grip mechanism for operating the cap 23. In the dome of the container, added ribs 86, 87 are integrally positioned between the outer portion of the handle, neck, and container wall, to strengthen the neck, raise the dome, and strengthen the container.

An L-shaped bracket 51 is pivotally attached at 40 to bracket 32. Spring 39 is wrapped around pin 40 to exert a closing force on the cap 23.

A hook-shaped operating lever 94 passes through slot 85 in the handle 81 and pivotally connects, at 97, to an operating arm on bracket 51.

In operation, the user holds the vertical outward portion of the handle 81 in the palm of his hands and wraps his fingers around the hook 94 to pull the pin 97 in the operating arm toward the outward vertical portion. This rocks the L-shaped bracket 51 about point 40 and in the direction "B" against the force of the spring 39, to raise the cap 23 and open the container.

When hook lever 94 is released, spring 39 forces cap 23 back to its normally closed position.

A third embodiment (FIG. 3) is primarily a waste disposal container. Container 100 has a dome-shaped top (here shown with reinforcing ribs 101 circumferentially disposed at the bottom of the dome, which is exemplary of the ribs which are removed from the can wall). Stated another way, the invention does not allow use of any wall discontinuities, such as the rib 101. At the top of the dome is a large neck 102 for easy passage of inflammable liquid materials. A fire arresting means, in the form of a metal cup with a perforated bottom is supported inside the neck.

Integral with the neck 102 is an upstanding fin 104 projecting away from a widened platform 105 giving horizontal strength to the fin and vertical strength to the dome.

A pair of elongated fasteners attach metal brackets 107, having an L-shaped cross section on either side of the fin 104 to strengthen and stabilize it. The outside edges of brackets 107 have integral and upstanding ears 113 for receiving a pair of horizontal pins 115, 116. A cylindrical spacer over pin 116 provides a rotatable cap support means. A coiled spring 124 around the spacer has two ends 122 resting on the brackets 107 to apply pressure to close cap 125.

At the center of gravity, a handle 130 is rotatably attached to the ears 113 by the pin 116 to swing freely in either direction "A" or "B" so that container 100 may be picked up while the spring 124 holds the cap 125 in position.

An L-shaped bracket 134 is rigidly attached to the cylindrical spacer to pivot about pin 116. A pin 135, attached to cap 125, runs upwardly through a hole at the end of the bracket 134, where C-washer 136 locks the assembly together.

Means are provided for selectively controlling the opening and closing of the cap 125. More particularly, a support bracket 140 attached to the bracket 134 receives a first or opening connector means, preferably in the form of a hook 141 made from sheet metal, which may be stamped on a punch press and folded into a somewhat U-shaped cross section. A post 143 runs horizontally between the two vertical handle brackets 130, at a position where it may be captured by the hook 141. Attached to the plastic fin 104 is another control means in the form of hook 144, also positioned to engage the horizontal bar 143.

To carry the container (FIG. 3), with the cap 125 closed, both of the hooks, 141, 144, are disengaged from the bar 143. The container may be picked up by the handle 130 and carried about while the cap 125 is held closed by the spring 124.

To open the container, the hook 141 is lifted and the handle 130 is moved forward in direction "B" until the hook fits over and captures the bar 143. Then the handle 130 is moved back in direction "A." The hook 141 forms a linkage for transmitting the pulling force from the handle 130 to the L-shaped bracket 134, thereby lifting the cap 125. If the user wishes to discard used inflammable liquids, he need only push the handle 130 in direction "A" to raise the cap 125. Thereafter, the handle 130 is released and the spring 124 automatically closes the cap 125.

Sometimes it may be desirable to prop the cap open. For this, the handle 130, with hook 141 captured by the bar 143, is pressed downwardly in direction "A." Then, the hook 144 is placed over the bar 143, and the handle 130 is released. The spring 124 presses downwardly on the bracket 134 and raises the handle 130 in direction "B" until restrained by hook 144, engaging the bar 143. To release the cap, the handle 130 is again pushed downwardly in direction "A", hook 144 is lifted back, and the handle 130 is released. The cap is closed by the spring 124.

A fourth embodiment incorporating a doube action vent is seen in FIGS. 4–13. Here a completely enclosed container has two openings or vents. One vent has an internal valve, and a pouring spout may be attached thereto. The other vent has a spring biased safety cap which raises for filling or to vent excessive internal pressure. Suitable springs normally urge the valve, cap, and handle to an automatically closed position.

A single handle linkage controls the two vents in timed sequence such that the pouring valve opens first and the venting safety cap opens second, as the can is tipped. Since the linkage has utility in many applications, it may be well to here explain briefly how it is used on a steel can as well as a plastic container.

In greater detail, FIG. 4 shows a steel container 150 having two openings or vents 153, 154. The opening 153 has an internal spring 155 (FIG. 6) biased valve 156 controlled by a valve stem 157. The other opening 154 has a spring biased safety cap 23 which may be opened either by hand for filling or automatically in response to internal pressure.

A handle controlled linkage 158 operates the two vents. More particularly, the lefthand end (as viewed in FIG. 4) of the linkage 158 operates the valve stem 157 for raising and lowering the internal valve 156 to enable or prevent the flow of fluids through a flexible hose 159. The righthand end of the linkage 158 is positioned to bear against a control lever 160 which is an integral part of the safety cap 23.

The plastic version of the container (FIG. 5) has an upstanding fin 181, which extends between the body opening necks 182, 183. The fin 181 is used for attaching the handle linkage and to reinforce and support the necks 182, 183. The fin 181 has apertures 184, 185, etc. therein, for attaching the handle and linkage.

Figure 7:
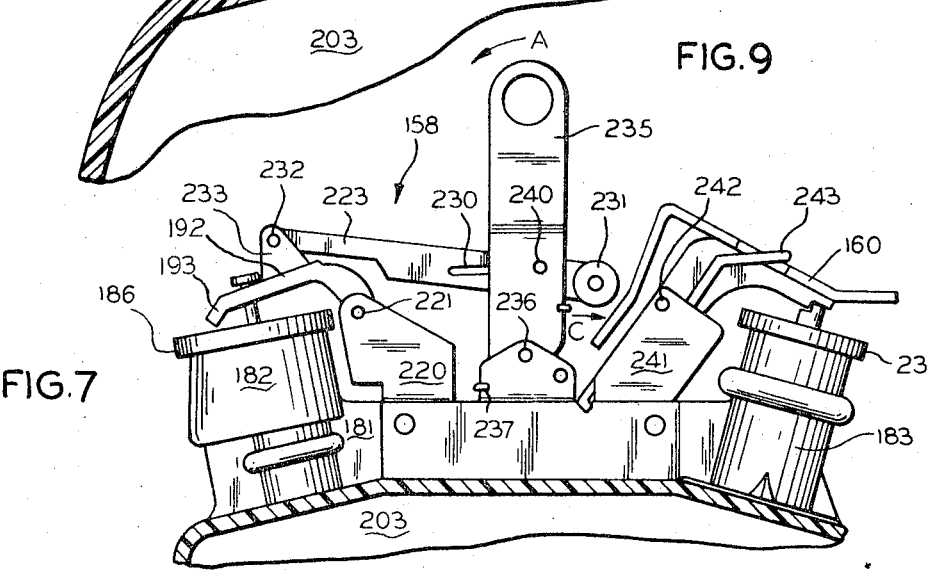
FIG. 7 is a side elevational view of the all plastic container of FIG. 5 with the handle, caps, and linkage of FIG. 6.

The details of the linkage arrangement will become more apparent from a study of FIGS. 6 and 7. A side view of the fin, supports, handle, and linkage appears in FIG. 7, and a perspective view of the linkage appears in FIG. 6.

In greater detail, the structures forming the openings or vents 182, 183 are upstanding cylindrical portions having one or more reinforcing rings and reinforcing ridges. The coil spring 155, and valve 156, with attached valve stem 157, are inside the pouring vent 182. The upper end of the vent 182 is closed and sealed by a cap 186 and a gasket (not shown). The cap 186 may be threaded to mate with threads in cylinder 182. Alternatively, the cap 186 may be attached by any other well known means.

The valve stem 157 projects through a hole in the cap 186 and engages washers 187. After assembly of the spring 155, valve 156, cap 186, and washers 187, the top of the stem 157 is swaged to make a complete subassembly.

Mounted on fin 181 is a saddle bracket 190. To the saddle bracket, pin 221 pivotally mounts an L-shaped bracket 192 having fork-shaped tines 193, 194, which fit under the washers 187 to control valve 156.

Normally, the spring 155 presses the valve 156 downwardly to seal the container 150. When the washers 187 are lifted by the tines 193, 194, spring 155 is compressed, valve 156 opens, and fluid may be poured from the container 150.

Figure 9:
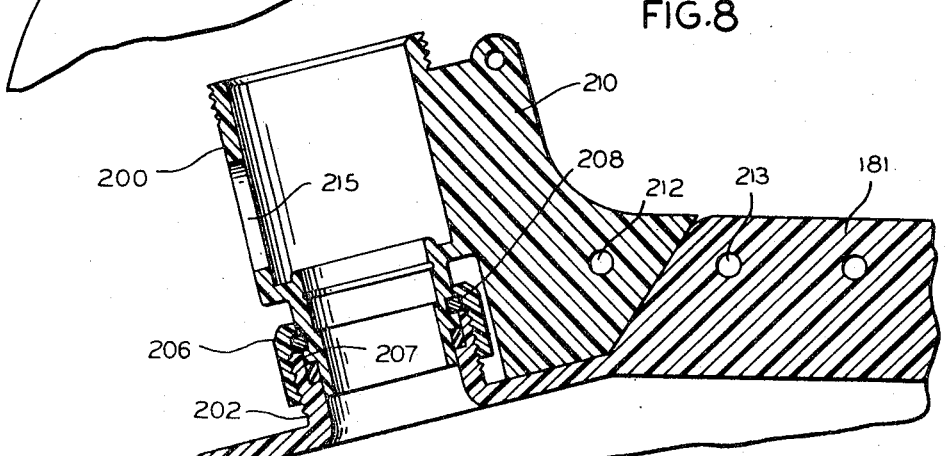

As shown in FIGS. 7–9, the cylindrical portions of the vents 182 or 183 may comprise two distinct parts 200, 202. The cylindrical portion 202 terminates in threads and may be either an integral part of the body 203 or an injection molded part. A valve body swivel ring 206 turns onto the neck threads and fits over lock ring 207 which is integral to valve body 200. An O-ring seal 208 prevents leakage at the coupling point. The injection molded portion 200 includes an integral bracket 210 which may have externally molded trusses 211 for giving further strength. The integral bracket 210 abuts against the end of rib 181 on the blow molded container and is joined thereto by L-shaped plates similar to 107 (FIG. 3) and fasteners fitting through apertures 212, 213, etc. The valve body 200 may include a flange section 215 for connecting outlet hose 159 thereto.

The bracket 220 supports the pin 221 which pivotally attaches the L-shaped bracket 192 to the saddle bracket assembly. The handle linkage comprises a bar 223 having a longitudinal slot 230 therein and at least one wheel 231 rotatably attached to the distant end thereof (as viewed in FIG. 6). The near end of the bar 223 is pivotally attached to the L-shaped bracket 192 by means such as a pin 232 extending through ears 233.

The handle 235 is pivotally attached at 236 to a pair of oppositely disposed integral lugs. The spring 237 normally forces the handle 235 to swing in the direction "A" to a forwardly folded position.

Means are provided for enabling the handle 235 to be lifted for carrying the container without opening either vent. More particularly, a pin 240 fits through the handle 235 and the slot 230 in the bar 223. Thus, if the handle is raised, there is a lost motion as the pin 240 moves through the length of the slot 230 before any linkage action occurs. This amount of movement also allows the user to secure a comfortable grip before lifting the weight of the container.

The filling vent 183 includes a safety cap assembly comprising cap 23 and bracket 160, mounted onto bracket 241 by pin 242. A spring 243 wraps around pin 242 and bears down on top of the cap 23. When the wheel 231 moves in direction "C," it encounters bracket 160, and the cap 23 opens.

The operation of the inventive structure should be apparent from a study of FIGS. 10–13. In each of these figures, the linkage ground is the fin 181 and the saddle bracket 190 attachment.

In greater detail, when the can is resting on the ground (FIG. 10), the handle 235 is pulled down by spring 237 to a lowered position at the forward end of the slot 230. The cap 23 may be raised by a person's hand lifting at 244, and the container may be filled.

The linkage operation during the pouring sequence is shown in FIGS. 11–13. More particularly, the container is picked up by the handle 235, and there is a lost motion while the pin 240 moves through the slot 230 (FIG. 11). Spring 155 holds the valve 156 closed, and spring 243 holds the cap 23 closed.

When the bottom of the container is lifted (FIG. 12) to tip the spout 182 downwardly, the pin 240 in the handle 235 engages the back end of the slot 230, and the bar 223 moves back in the direction of arrow "C," to pull pin 232. Bracket 193 pivots about point 221 in the direction "D." Valve 156 rises against the bias of the spring 155. The wheel 231 has not yet pushed against the bracket 160 to open the cap 23. Thus, the valve 156 opens first. Since cap 23 is located at a high point on the container, there is no danger that the inflammable fluid will pour out of the vent 183 before it pours out of the hose 159.

Finally, at the end of the sequence (FIG. 13), the bottom of the can is lifted high enough to provide a steady flow of the fluid from the can. The handle 235 is pulled back to its rearmost point in the direction "C." The valve 156 is at its maximum opening. The wheel 231 forces the bracket 160 to maximum displacement, and the cap 23 is also open widely.

When the handle is released, the sequence reverses, the cap 23 closes first, then the valve 156, and finally the handle 235 is spring biased to its normal folded position.

Preferably, these containers are made in one piece of new, advanced quality, linear high density polyethylene. First, the all plastic container has a low cost, is modern in appearance, attractive in use, and made with a molded precision. The plastic is durable, has greater strength, is more flexible against dents, and is cooler handling. Second, the method of hardware attachment to the fin makes a good, strong, and durable connection without piercing the wall of the container. The hardware is relatively heavy, and it has a maximum contact area with the plastic in order to provide a heat sink to accelerate a melting of the plastic. Third, the metal hardware parts may be dip-coated with plastic to prevent generation of sparks and preclude exposure of bare metal surfaces or plated to prevent corrosion or rust.

The parent application disclosures of FIGS. 1–13 show that the plastic containers were constructed with reinforcing ribs, as at 101, (FIGS. 1, 3) for adding circumferential strength. The edges of these ribs form abrupt discontinuities of material thickness, where internal material stress is great. If the container is in a fire, the inside pressure increases, the reinforced ribs provide greater strength and prevent a uniform expansion of the container walls. As the unreinforced part of the wall expands, the plastic material is subjected to a severe differential in internal stress, especially along the edges of the ribs 101. As a result, the container ruptures and burning fluids spill out to start a fire. Also, these prior containers are relatively tall and narrow. Therefore, a small surface area of inflammable fluid is exposed to the flame, and the fire burns for a longer period of time.

In keeping with an aspect of the invention, the above-stated and other objects are accomplished by providing plastic containers having uniform wall thickness, with a lower and wider silhouette, and with side walls which are either perpendicular to the container plane at the bottom of the container or are tapered inwardly toward the top.

Figure 14:
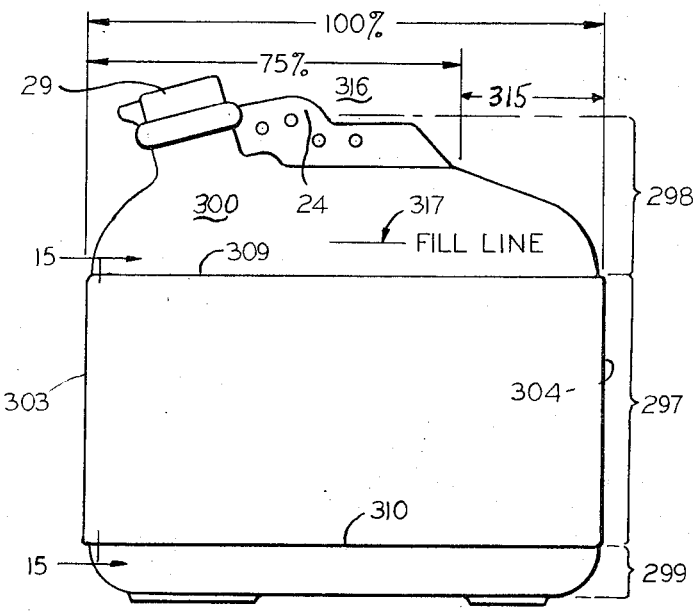
FIG. 14 is a side elevational view of the inventive plastic container showing how the construction of the parent embodiment of FIG. 1 is modified according to the invention.

In greater detail, the inventive container 300 (FIG. 14) has a low and wide silhouette which may be described as a cylindrical center section 297, a superimposed dome-shaped top section 298, and a somewhat rounded bottom section 299. In one exemplary structure, the container was 10 ½ inches in diameter and 10 ¾ inches high. The terms "cylindrical," "dome," and "rounded" are here used only for convenience of expression. This usage does not imply that the invention is limited to any particular cross-section or specifically to circular cross-sections. Quite the contrary, the cross-section of the can may be oval, square, rectangular, circular, or any other convenient and suitable shape.

Figure 16:
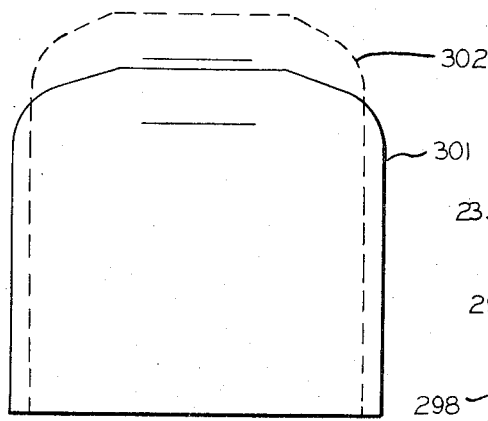
FIG. 16 shows the inventive principles indicating the changes made in the profile of the safety container of FIG. 1 pursuant to the invention.

As shown by solid lines 301 in FIG. 16, the inventive container has a squat appearance, as compared to the tall and narrow silhouette (shown by dotted lines 302) of the prior art containers. Preferably, the width of the inventive can 300 is approximately equal to or greater than its height.

The side walls 303, 304 of the inventive container are either vertical when the can is at rest or tapered inwardly toward the top. Thus, the upper cross-section periphery at 309 of cylinder 297 is no larger than and is positioned within the upward projection of the lower cross-section at 310, when the can is resting in a normal position. The top preferably terminates in a raised or dome shape 298 so that the hottest internal air rises to the top center of the container. Also, any nearby fire heats the hardware, which is a good heat sink that begins to melt the plastic. Thus, the top area melts before the rest of the container melts.

The side walls 303, 304 of the cylindrical can section 297 may preferably have a uniform thickness in the order of 0.150–0.200 inches, for the high density polyethylene material. Other suitable materials would have comparable thickness for the characteristic strength and burning rate. Among other reasons, this wall thickness was selected to further reduce the ultraviolet aging of the plastic.

Figure 15:
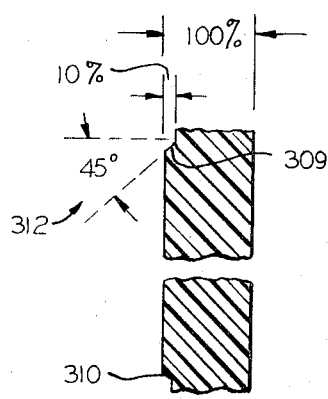
FIG. 15 is a fragmentary cross section of the wall of FIG. 14 taken along line 15—15 thereof.

As best seen in FIG. 15, the wall thickness is reduced approximately 10 percent at the bottom perimeter 309 of the dome-shaped top 298. This approximately 10 percent reduced thickness is also repeated at the perimeter 310 of the somewhat rounded bottom section 299 of the can.

3 feet are integrally molded on the bottom section 299 to provide a convenient resting stand and yet to enable the can to be tipped while it is resting on the rounded bottom edge. The can's dimensions are preferably such that if the can is filled to fill line 317 and then tipped on the rounded bottom edge, as far as approximately 30°–45° off vertical, the can will automatically right itself without falling over.

Preferably, the perimeter ledge 309, at the point of reduced thickness, has an angular offset 312 of about 45° off the horizontal. Therefore, when the container begins to burn, there is about 10 percent less material to burn in the dome 298, as compared with the material to burn in the side walls of cylinder 297. Moreover, with the 45° angular offset 312, there is a gradual change in thickness which distributes any internal material stress over a greater distance, thereby avoiding sudden and abrupt discontinuities where internal material stress is concentrated, as it would be if ribs 101 are used. In some materials, it may be desirable to increase the angles 312 to be greater than 45° so that the material stresses of any wall thickness discontinuity is distributed over an even greater distance.

The neck portion 29 and fin 24 lie along a diameter of the container, but do not occupy more than about 75 percent of the horizontal width of the dome 298. Thus, the remaining 25 percent horizontal distance 315 of the dome will melt quicker than the 75 percent area 316 supported by the fin 24 and the neck 29.

Figure 17:
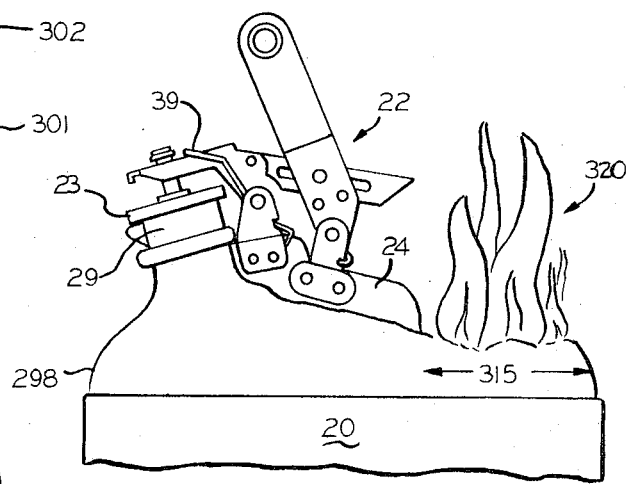
FIGS. 17–19 show successive stages in the consumption of the container, as it burns.

The hardware 22 (FIG. 17) is heavy enough and has sufficient contact area with the plastic wall to insure a desired rupture and collapse of the dome 298 when the container is in a fire. In greater detail, suppose that the can is full of gasoline, which means that the top of the fluid is approximately at a fill line 317 marked on the container side wall. As the fire begins to burn, the cap 23 raises when the internal pressure exceeds the pressure of spring 39 (about 3–4 psig).

With a rapidly increasing internal pressure, hot gas rises in the dome 298, and the top begins to melt near the center of the can. The hardware 22 is attached to a bracket at the center of gravity of the container, but the center of gravity of the hardware is designed to tear the melting dome most efficiently and to rupture the wall. Thus, the weight of the hardware 22 acts downwardly under the force of gravity and the plastic in area 315 is pulled downwardly into the container 20. As the plastic stretches and ruptures, the first holes begin to appear, and the internal pressure is relieved. The surface of the inflammable fluid is exposed to the atmosphere. The danger of an explosion then ends. The falling weight of the handle 22 pulls the remainder of the dome 298 into the container 20.

According to the invention, the relationship between the wall thickness, cross-sectional area, and the height of the fill line are such that the fluid inside the container is consumed by fire at a rate wherein the burning surface level 322 of the fluid is always lower than the melting edge of said container.

Figure 18:
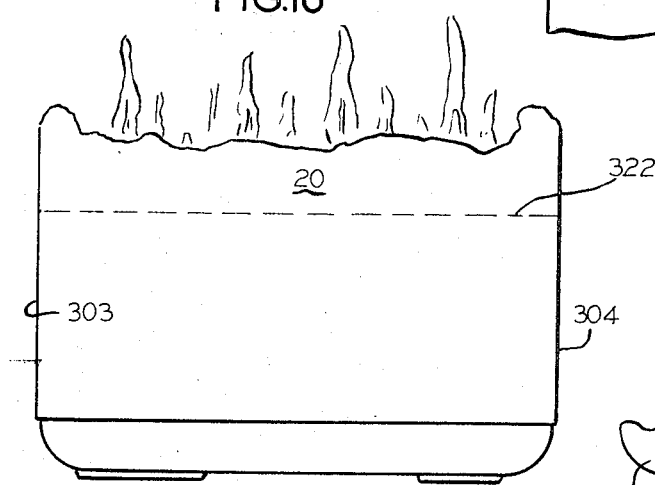

The slightly thicker side walls 303, 304 require slightly longer to melt, and they are not being pulled downwardly by the weight of the hardware 22. Hence, the entire dome 298 collapses into the container before the side walls begin to melt. The gasoline is now burning freely in the open atmosphere (FIG. 18). However, the melt rate and burn rate are such that the gasoline is consumed faster than the plastic.

Figure 19:
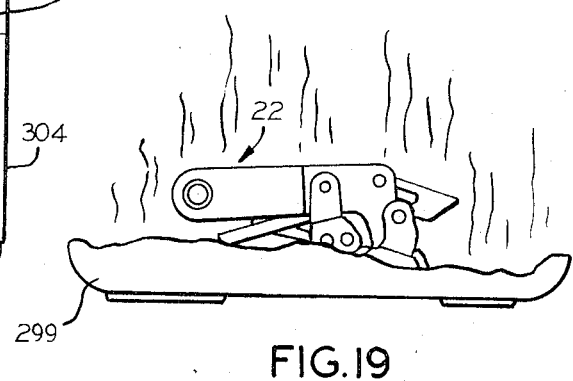

When the gasoline is finally consumed (FIG. 19), the rounded bottom part 299 contains the charred remains of the hardware 22 and, perhaps, part of the dome which fell into the burning fluid. Thus, the fluid has completely burned, but the plastic container has contained the flaming fluid to prevent a spreading fire.

One container, which was actually subjected to a fire exposure test, was filled to its rated capacity with gasoline. In its normally closed condition, the safety can was placed in a square steel pan containing water on which floated 1 inch (more or less) of normal heptane. The heptane was ignited and allowed to burn until consumed. Approximately 2 ½ minutes after the start of the fire test, the top of the safety container collapsed inwardly allowing free burning of the gasoline through the then open container top. Subsequently, the rate of melting of the container side wall, with respect to liquid contents level within the container, was such that the flammable liquid was contained within the side walls throughout the test. There was no can rupture or spillage of the flammable liquid to intensify the exposure fire. The results were satisfactory, typical of unwetted surfaces. This test meets the intent of the fire exposure test of government and industry.

The principles of the invention have been described above in connection with the first embodiment of FIG. 1. The same principle may also be used with the other embodiments shown herein and, more generally, with all plastic safety containers. It is to be understood that this description is made only by way of example and not as a limitation on the scope of the invention. Therefore, the appended claims are to be construed to cover all equivalent structures.

I claim:

1. An integral one piece container of high density polyethylene material having a completely and continuously closed inner surface terminating in at least one opening, said container further including a cylindrical center section, a superimposed dome-shaped top section and a substantially rounded bottom section, said container having a width at least equal to its height, the cylindrical center section having a uniform wall thickness in the order of 0.150–0.200 inches, said superimposed dome-shaped top section and rounded bottom section having a wall thickness of approximately 10 percent less than said cylindrical section, said 10 percent difference in thickness between said cylindrical section and said dome-shaped top section and said rounded bottom section comprising a perimeter ledge with an angular offset of about 45° off the horizontal to effect a gradual transition in wall thickness.

2. The container of claim 1 and a thickened fin formed on the outside surface of the dome-shaped top section of said container, said fin being raised to project outwardly from said outside wall surface of said plastic container, hardware attachment means fitting against said fin for securing a separate structure to the outside surface of said container, and means for attaching said attachment means to said fin without breaking through said inner surface, said fin and attachment means being confined to an area on said dome-shaped top section which extends over a distance which is no greater than 75 percent of the diameter of said dome-shaped top section.

3. The container of claim 2 wherein said hardware comprises a handle which is mounted in vertical alignment with the center of gravity of said container and the center of gravity of said hardware is located to tear a melting dome and to drag said melting dome downwardly into said container.

4. The container of claim 1 wherein the cylindrical center section is perpendicular to the bottom section.

5. The container of claim 1 and hardware with heat collecting characteristics attached to said superimposed dome-shaped top section, said wall thickness being so related to the characteristics of the plastic and of the container fluid that the plastic melts at a slightly slower rate than the fluid is consumed, said characteristics being such that said dome-shaped top section melts adjacent said hardware and tears under the weight of said hardware before explosive internal pressures build within the container and the wall melts at a rate which is slower than the fluid is consumed by burning so that the fluid is not spilled from the melting can.

* * * * *